United States Patent [19]

Faibish et al.

[11] Patent Number: 5,471,214
[45] Date of Patent: Nov. 28, 1995

[54] COLLISION AVOIDANCE AND WARNING SYSTEM

[75] Inventors: Sorin Faibish, Haifa; Ezra Shamay, Kiryat Bialik; Shalom Shteckelman, Kiryat Haim, all of Israel

[73] Assignee: State of Israel Ministry of Defense, Armament Developmental Authority, Rafael, Haifa, Israel

[21] Appl. No.: 982,188

[22] Filed: Nov. 25, 1992

[30] Foreign Application Priority Data

Nov. 27, 1991 [IL] Israel ....................................... 100175

[51] Int. Cl.⁶ .................................................. G01S 13/93
[52] U.S. Cl. .................................................. 342/70; 342/54
[58] Field of Search ................................ 342/70, 71, 72, 342/54

[56] References Cited

U.S. PATENT DOCUMENTS

| | | | |
|---|---|---|---|
| 3,749,918 | 7/1973 | Johns | 340/904 X |
| 4,039,782 | 8/1977 | Burckhardt et al. | 342/71 X |
| 4,072,945 | 2/1978 | Katsumata et al. | 342/70 |
| 4,073,359 | 2/1978 | Fujiki et al. | 180/169 |
| 4,097,864 | 6/1978 | Endo et al. | 342/71 |
| 4,158,841 | 6/1979 | Wüchner et al. | 342/71 |
| 4,168,499 | 9/1979 | Matsumura et al. | 342/70 |
| 4,537,271 | 8/1985 | Ito et al. | 342/71 X |
| 4,622,636 | 11/1986 | Tachimura | 364/424 |
| 4,628,317 | 12/1986 | Nishikawa et al. | 340/903 |
| 4,641,136 | 2/1987 | Kowalczyk | 340/903 |
| 4,757,450 | 7/1988 | Etoh | 364/426 |
| 4,926,171 | 5/1990 | Kelley | 340/961 |
| 5,008,678 | 4/1991 | Herman | 342/158 |
| 5,023,617 | 6/1991 | Deering | 342/70 |
| 5,051,754 | 9/1991 | Newberg | 342/375 |
| 5,165,497 | 11/1992 | Chi | 180/169 |
| 5,170,168 | 12/1992 | Roth | 342/45 |
| 5,204,682 | 4/1993 | Beasley | 342/117 |
| 5,227,784 | 7/1993 | Masamori et al. | 340/903 |
| 5,260,710 | 11/1993 | Omamyada et al. | 342/70 |
| 5,266,955 | 11/1993 | Tzumi et al. | 342/70 |
| 5,268,692 | 12/1993 | Grosch et al. | 342/70 |

FOREIGN PATENT DOCUMENTS

| | | |
|---|---|---|
| 0412719 | 2/1991 | European Pat. Off. . |
| 3922085 | 1/1991 | Germany . |
| 89/06808 | 7/1989 | WIPO . |

OTHER PUBLICATIONS

J. Skotnicki et al, "An X–Band Collision Avoidance Radar For Emergency Vehicles", 1980 IEEE Region V Conference Digest 21 Apr. 1980, San Antonio, Texas, USA pp. 81–85.

Y. Bar-Shalom, Ed., "multitarget Multisensor Tracking: Advance Applications":, Artech House Publishers, 1990.

S., Faibish & Moskovitz, "A New Closed–Loop Nonlinear Fillter Desighn":, Proc. of the 1st European Control Conference. pp. 38–43, Grenoble, France. (1991).

L. L. Nagy, "Electromagnetic Reflectivity Characteristics of Roa Surfaces", IEEE Trans. on Vehicular Tech. vol. VT–23, No. 4, Nov., 1974.

D. J. Daniels, "Radar for Hazard Warning", (1988) 18th International Symposium on Automotive Technologies.

R. A. Chandler & L. E. Wood, "System Consideration for the Design of Radar Braking Sensors", IEEE Trans. on Vehicular Technology, vol. VT–26, No. 2, May 1977.

E. F. Belohoubek, "Radar Control for Automotive Collision Mitigation and Headway Spacing", IEEE Trans. on Vehicular Tech. vol. VT–31 No. 2, May 1982.

Primary Examiner—John B. Sotomayor
Attorney, Agent, or Firm—Helfgott & Karas

[57] ABSTRACT

A collision avoidance and warning system for land vehicles including radar transmission and receiving apparatus for sensing the presence of objects within a spatial range relative to a vehicle, multiple target tracking apparatus receiving an output from the radar transmission and receiving apparatus for tracking a plurality of targets sensed by the radar transmission and receiving apparatus, auxiliary non-radar target sensing apparatus and alarm decision apparatus receiving an input from the multiple target tracking apparatus and from the auxiliary non-radar target sensing apparatus for indicating the alarm status of a target and providing an output indication to alarm generating apparatus.

22 Claims, 14 Drawing Sheets

FIG.4
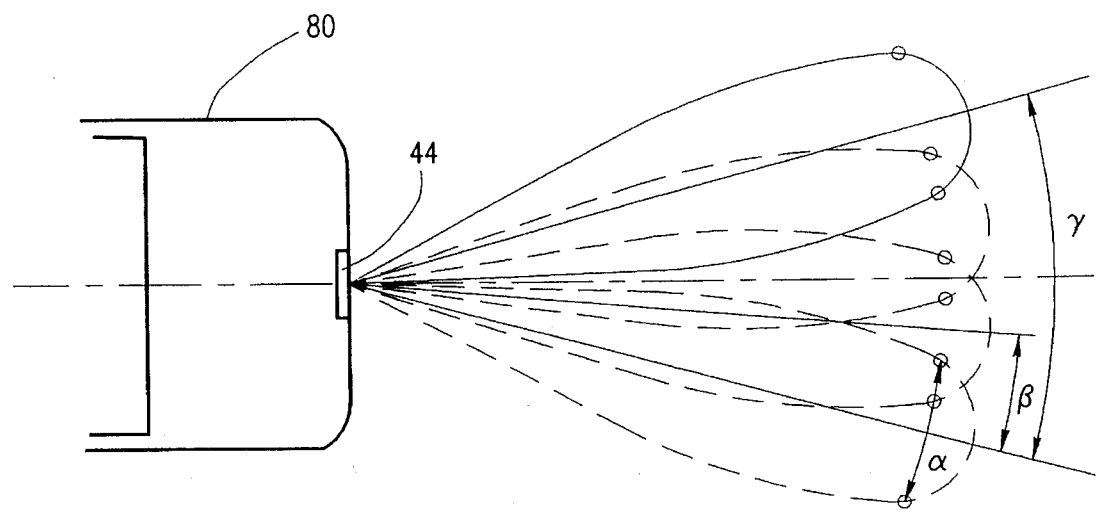
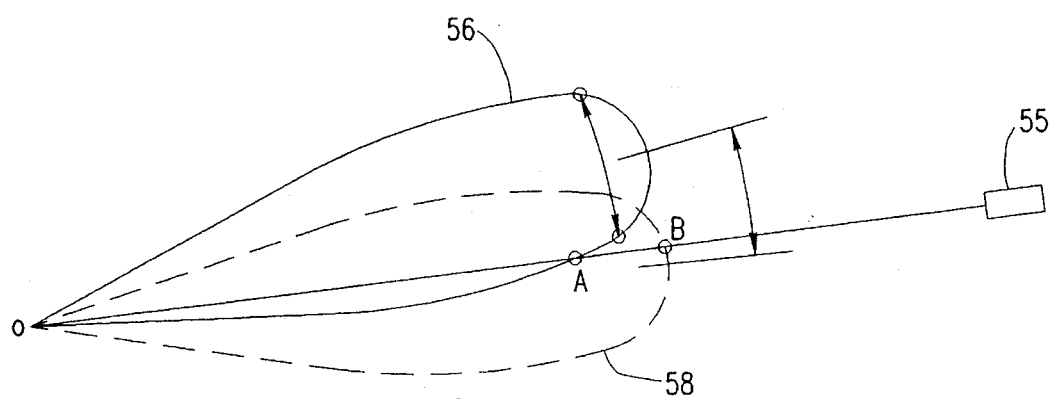
FIG.6

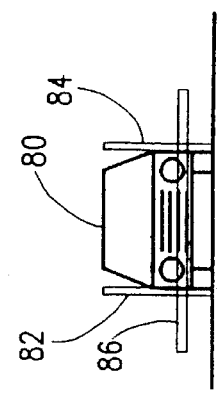
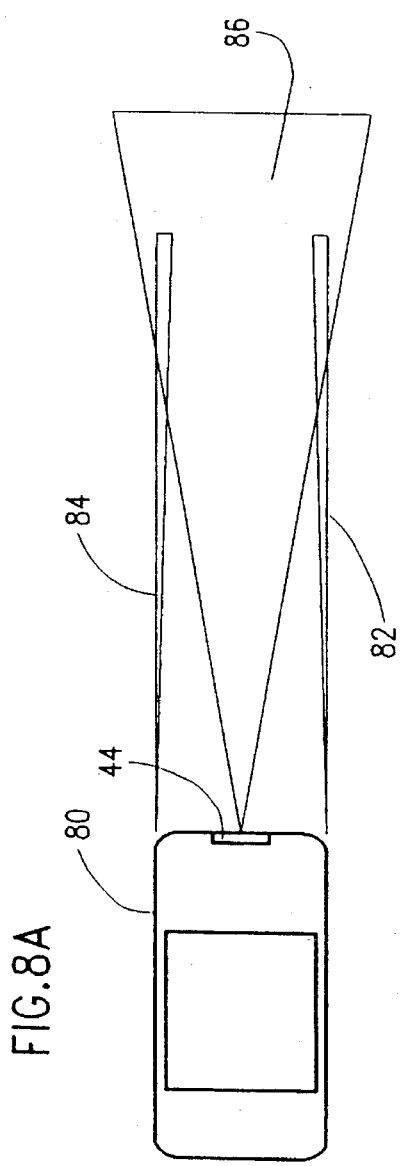
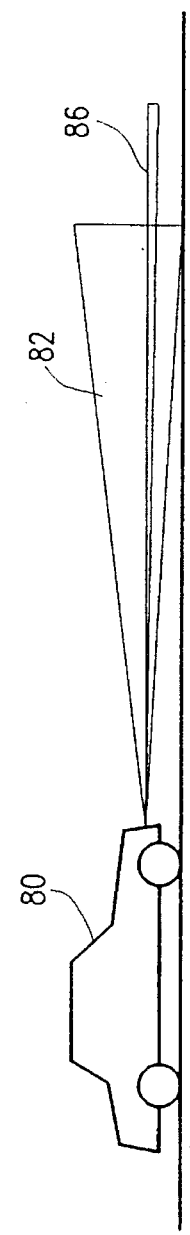
FIG.8A
FIG.8B
FIG.8C

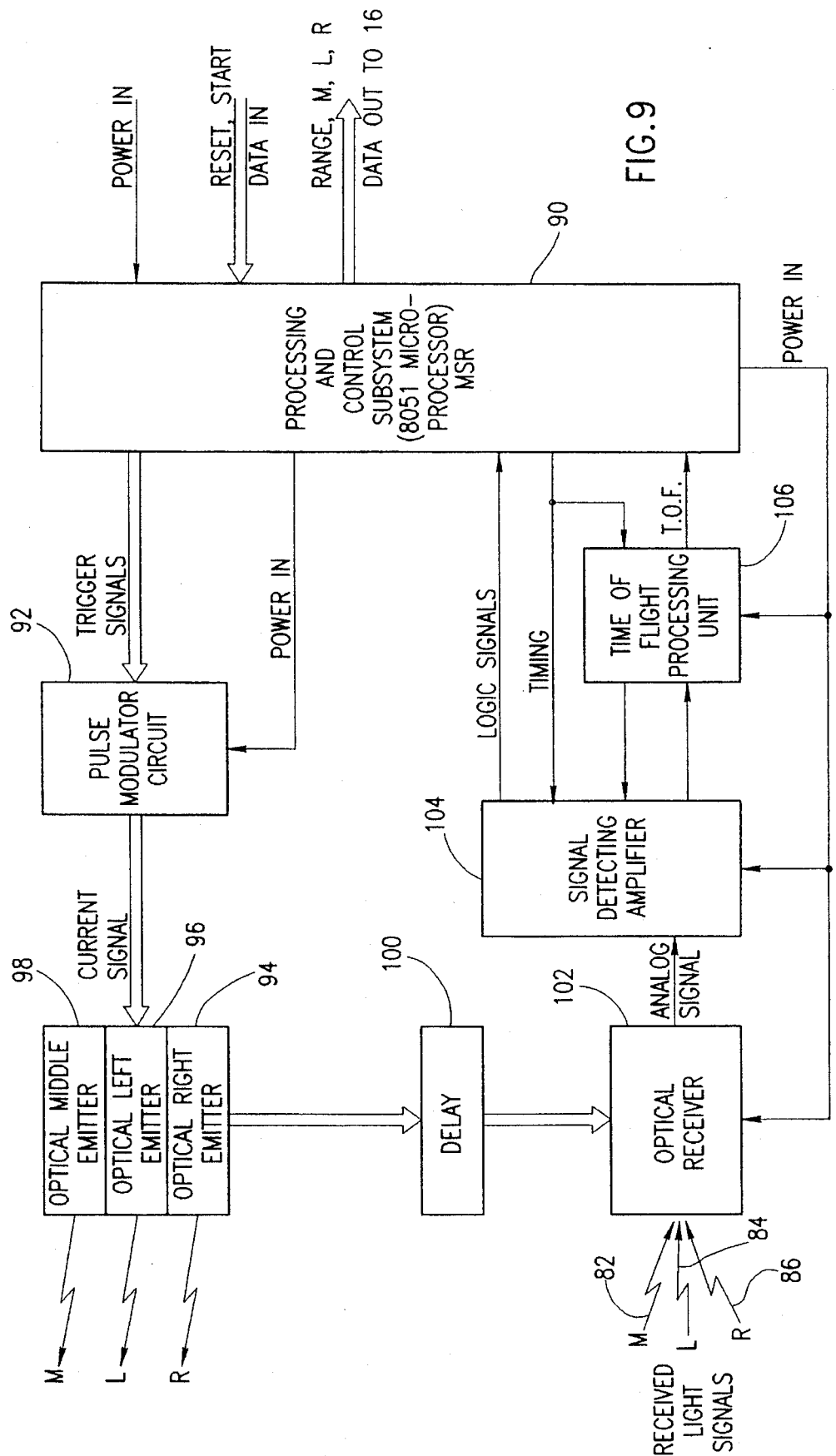

COLLISION AVOIDANCE AND WARNING SYSTEM

FIELD OF THE INVENTION

The present invention relates to collision avoidance and warning systems for land vehicles.

BACKGROUND OF THE INVENTION

There exists much literature relating to collision avoidance and warning systems for land vehicles. Examples of such literature include the following references, the disclosures of which are hereby incorporated by reference:

Merrill I. Skolnik, *Introduction to Radar Systems*, 1981, 2nd Edition, Chapter 3.3, FM-CW Radars.

Daniels, D. J. *Radar for Hazard Warning*, 18th International Symposium on Automotive Technologies, May 30–Jun. 3, 1988.

*Radar Handbook*, Merrill I. Skolnik, McGraw-Hill Book Company, 1970, particularly chapters 21 and 25, pertaining to tracking radar and ground echo;

Eli Brookner, Raytheon Company, Wayenad, Mass., U.S.A. *Radar Technology*, 1977, particularly chapters 9 and 26 on Fast Fourier Transforms and Kalman filters;

Chandler, R. A. and Wood, Lockett E., *System considerations for the design of radar beaching sensor*, IEEE Trans. on Vehicular Technology, Vol. VT - 26, No. 2, May 1977;

Erwin F. Belohoubek, *Radar Control for Automotive Collision Mitigation and Headway Spacing*, IEEE Trans. on Vehicular Tech., Vol. VT-31, No. 2, May, 1982; and Nagy, Louis L. *Electromagnetic Reflectivity Characteristics of Road Surfaces*, IEEE Trans. on Vehicular Tech. Vol. VT-23, No. 4, Nov. 1974.

Existing collision warning systems have not yet attained acceptance in the marketplace, due in part to their high false alarm rates, which causes them to become a nuisance to the driver.

SUMMARY OF THE INVENTION

The present invention seeks to provide an improved collision avoidance and warning system which identifies potentially dangerous targets, also termed herein objects, and is characterized by an acceptable false alarm rate.

There is thus provided in accordance with a preferred embodiment of the present invention a collision avoidance and warning system for land vehicles including:

radar transmission and receiving apparatus for sensing the presence of objects within a spatial range relative to a vehicle;

multiple target tracking apparatus receiving an output from the radar transmission and receiving apparatus for tracking a plurality of targets sensed by the radar transmission and receiving apparatus;

auxiliary non-radar target sensing apparatus; and alarm decision apparatus receiving an input from the multiple target tracking apparatus and from the auxiliary non-radar target sensing apparatus for indicating the alarm status of a target and providing an output indication to alarm generating apparatus.

In accordance with a preferred embodiment of the present invention, the auxiliary non-radar target sensing apparatus includes a laser energy transmitter and receiver.

Additionally in accordance with embodiment of the invention, the system also includes alarm generating apparatus for providing an indication of alarm status to a vehicle driver.

Preferably, the radar transmission and receiving apparatus includes plural radar antenna apparatus.

In accordance with a preferred embodiment of the present invention, the plural antenna apparatus includes at least one antenna for sensing vehicle ground speed.

Preferably, the plural antenna apparatus includes a plurality of antennas for target detection.

In accordance with a preferred embodiment of the present invention, the plurality of antennas are arranged such that their detection regions are distributed in partially overlapping orientation in azimuth.

Preferably, the radar transmission and receiving apparatus also includes apparatus for comparing the outputs of more than one of the plurality of antennas relating to a given object in order to define the angular position of the object with enhanced resolution.

In accordance with a preferred embodiment of the invention, at least one of the radar transmission and receiving apparatus and the multiple target tracking apparatus includes apparatus for distinguishing moving targets from stationary targets.

Preferably, the multiple target tracking apparatus provides an output indication of the velocity vector of a plurality of moving targets.

Additionally in accordance with a preferred embodiment of the present invention, the multiple target tracking apparatus includes apparatus for disregarding targets whose velocity vectors do not fit within a predetermined profile.

Further in accordance with a preferred embodiment of the invention, the apparatus for disregarding includes apparatus for disregarding targets whose vectors do not fall within a danger envelope defined with respect to the velocity vector of a protected vehicle. Characteristics of the protected vehicle such as a velocity vector thereof are also termed herein "own" characteristics, such as "own velocity vector".

In accordance with a preferred embodiment of the invention, the auxiliary non-radar target sensing apparatus includes laser apparatus for defining first and second generally vertical beam walls which delimit a range of protection with respect to a protected vehicle.

Additionally in accordance with a preferred embodiment of the invention, the auxiliary non-radar target sensing apparatus includes laser apparatus for defining a generally horizontal beam fan spaced from the roadway which at least partially delimits a range of protection with respect to a protected vehicle.

Further in accordance with a preferred embodiment of the present invention, the system also includes apparatus for sensing impaired operation of the auxiliary non-radar target sensing apparatus and for modifying the operation of the system in accordance therewith.

In accordance with a preferred embodiment of the present invention, the apparatus for sensing and modifying includes apparatus for operating the radar transmitting and receiving apparatus in an occupancy probability sensing mode of operation.

There is also provided in accordance with a preferred embodiment of the present invention a collision avoidance and warning method for land vehicles including the steps of:

radar sensing the presence of objects within a spatial range relative to a vehicle;

multiple target tracking a plurality of targets sensed by radar;

sensing targets by auxiliary non-radar sensing techniques; and receiving a multiple target tracking input and an auxiliary non-radar target sensing input and on the basis thereof indicating the alarm status of a target and providing an output indication to a driver.

In accordance with a preferred embodiment of the present invention, the auxiliary non-radar target sensing step includes a laser energy transmission and reception step.

Preferably, the radar sensing step includes comparing the outputs of more than one of a plurality of antennas relating to a given object in order to define the angular position of the object with enhanced resolution.

In accordance with a preferred embodiment of the invention, at least one of the radar sensing and the multiple target tracking steps includes distinguishing moving targets from stationary targets.

Preferably, the multiple target tracking step provides an output indication of the velocity vector of a plurality of moving targets.

Additionally in accordance with a preferred embodiment of the present invention, the multiple target tracking step is operative for disregarding targets whose velocity vectors do not fit within a predetermined profile.

Further in accordance with a preferred embodiment of the invention, the step of disregarding includes disregarding targets whose vectors do not fall within a danger envelope defined with respect to the velocity vector of a protected vehicle.

In accordance with a preferred embodiment of the invention, the auxiliary non-radar target sensing step includes defining first and second generally vertical laser beam walls which delimit a range of protection with respect to a protected vehicle.

Additionally in accordance with a preferred embodiment of the invention, the auxiliary non-radar target sensing step includes defining a generally horizontal laser beam fan spaced from the roadway which at least partially delimits a range of protection with respect to a protected vehicle.

Further in accordance with a preferred embodiment of the present invention, the method also includes the steps of sensing impaired auxiliary non-radar target sensing and modifying operation in accordance therewith.

In accordance with a preferred embodiment of the present invention, the steps of sensing and modifying include operating the radar transmitting and receiving apparatus in an occupancy probability sensing mode of operation.

BRIEF DESCRIPTION OF THE DRAWINGS

The present invention will be understood and appreciated more fully from the following detailed description, taken in conjunction with the drawing in which:

FIG. 4 is a more detailed illustration corresponding to FIG. 3A and illustrating the partially overlapping regions of coverage of a plurality of radar antennas;

FIG. 6 is a simplified illustration of a technique of processing radar signals from the plurality of partially overlapping regions of coverage illustrated in FIG. 4;

FIGS. 8A, 8B and 8C are respective top, side and front view illustrations of the maximum danger box of FIG. 7;

FIG. 9 is a block diagram illustration of electro-optical laser transmitter and receiver apparatus forming part of the apparatus of FIG. 1;

DETAILED DESCRIPTION OF A PREFERRED EMBODIMENT

Figure 1:
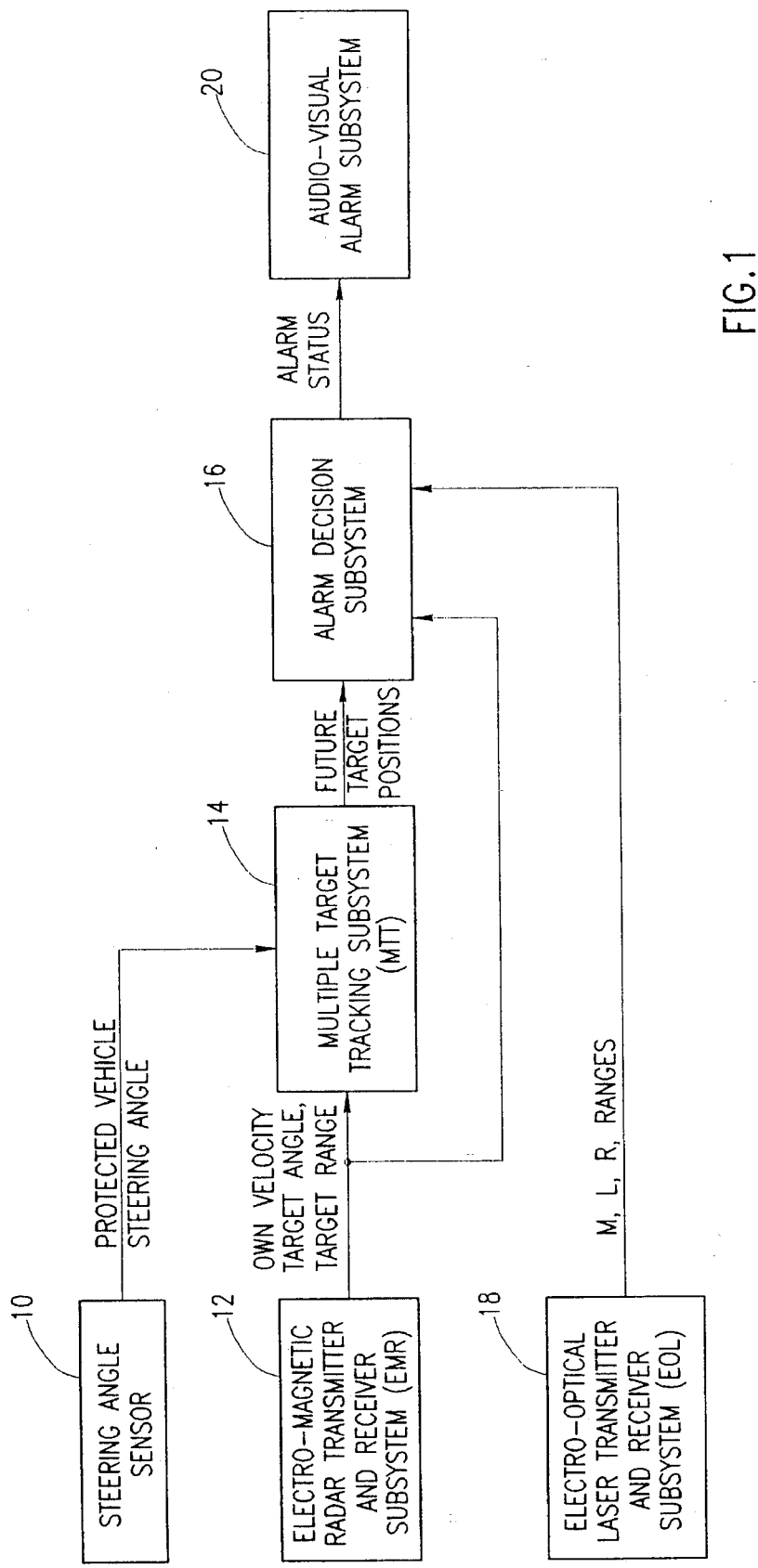
FIG. 1 is a generalized block diagram illustration of a collision avoidance and warning system constructed and operative in accordance with a preferred embodiment of the present invention.

Reference is now made to FIG. 1, which illustrates in generalized block diagram form, a collision avoidance and warning system constructed and operative in accordance with a preferred embodiment of the present invention, which may be mounted on a protected vehicle.

The system comprises a vehicle steering angle sensor 10, such as a dynamically compensated DDASL-TAM7 magnetometer based on magnetic flux changes measurements. The system also comprises an electro-magnetic radar transmitter and receiver subsystem 12 which supply inputs to a multiple target tracking subsystem 14. Multiple target tracking subsystem 14 provides a target identification output to an alarm decision subsystem 16 which also receives an input from the electro-magnetic radar transmitter and receiver subsystem 12 and from an electro-optical laser transmitter and receiver subsystem 18.

It is a particular feature of the present invention that dual mode sensing is employed in defining an alarm event. It is a further particular feature of the present invention that laser apparatus is employed for this purpose.

The output of the alarm decision subsystem 16 is provided to an audio-visual alarm subsystem 20, which may provide an audio, visual, or any other suitable single or combined alarm output to the driver to warn him of an impending collision. The alarm indication may be provided by any suitable conventional alarm indication technique.

Figure 2:
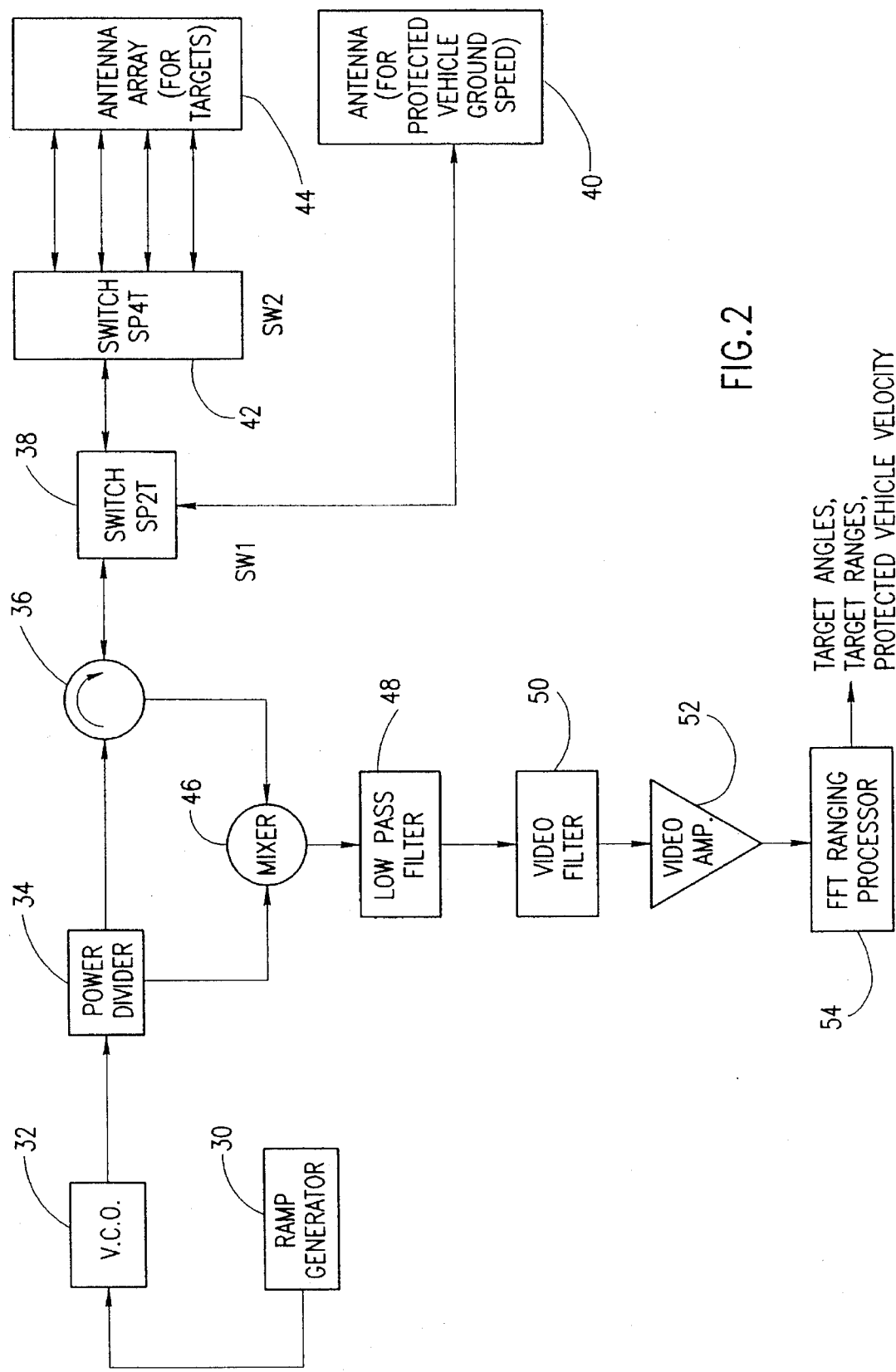
FIG. 2 is a block diagram illustration of electromagnetic radar transmitter and detector apparatus useful in the embodiment of FIG. 1.

Reference is now made to FIG. 2 which illustrates in block diagram form FM-CW electromagnetic radar transmitter and receiver apparatus useful in implementing subsystem 12 of FIG. 1. As seen in FIG. 2, a ramp generator 30 provides a ramp voltage signal to a voltage controlled oscillator 32, such as a GDV-42, commercially available from Militech. Oscillator 32 provides a modulating input to a power divider or directional coupler 34, such as an Alpha 555A.

The output of directional coupler 34 is supplied via a ferrite circulator 36, such as an Alpha 160A, to a two-way multiplexing switch 38. The outputs of a two-way multiplexing switch 38 are supplied to an antenna 40, which is used for detecting ground speed of a protected vehicle in which the apparatus of FIG. 1 is installed. Outputs from multiplexing switch 38 are also supplied via a four-way multiplexing switch 42 to a four element antenna array 44, which is employed for angular identification and ranging of targets.

It is appreciated that antenna 40 and antenna array 44 are used for both transmission and reception and their received signal outputs are supplied via respective switches 38 and 42 and via circulator 36 to a mixer 46 such as a MXP-42, commercially available from Militech, which also receives an output from power divider 34. Mixer 46 effectively compares the received signals with the transmitted signals for determining their frequency/time relationship.

The output of mixer 46 is supplied via a low pass filter 48 and a video filter 50 to a video amplifier 52 which provides an amplified output to an FFT ranging processor 54. Processor 54 provides output indications of protected vehicle velocity and of target angle and target range, using a suitable technique such as a Fast Fourier Transform (FFT).

Figure 5:
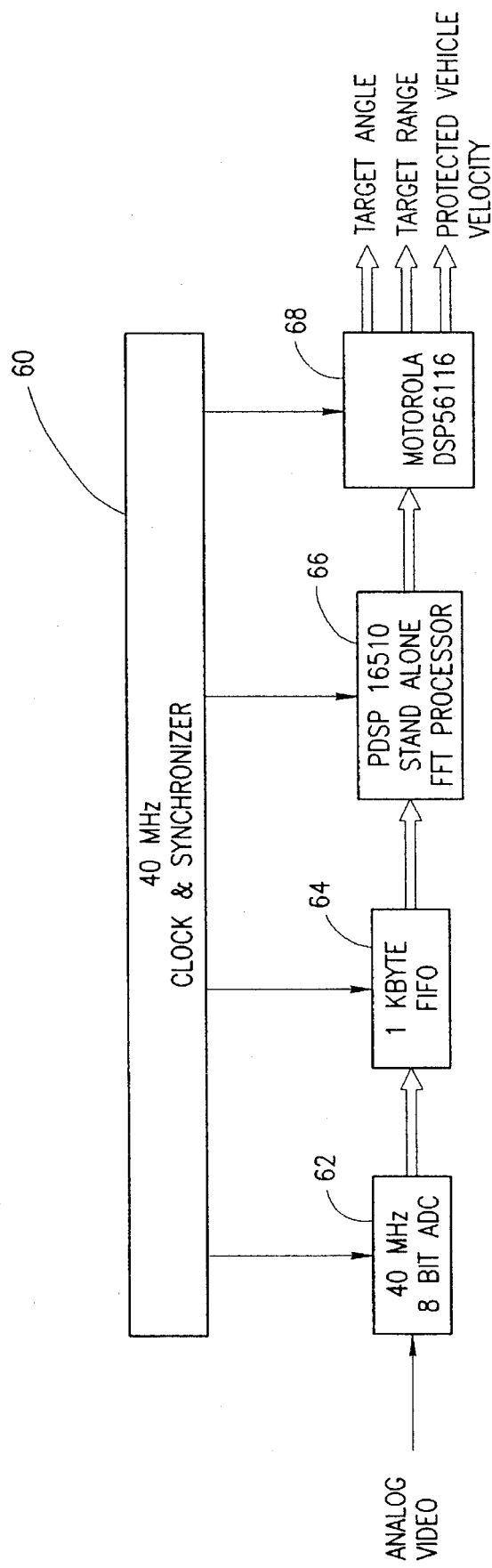
FIG. 5 is a simplified block diagram illustration of FFT ranging apparatus forming part of the apparatus of FIG. 2.
Figure 7:
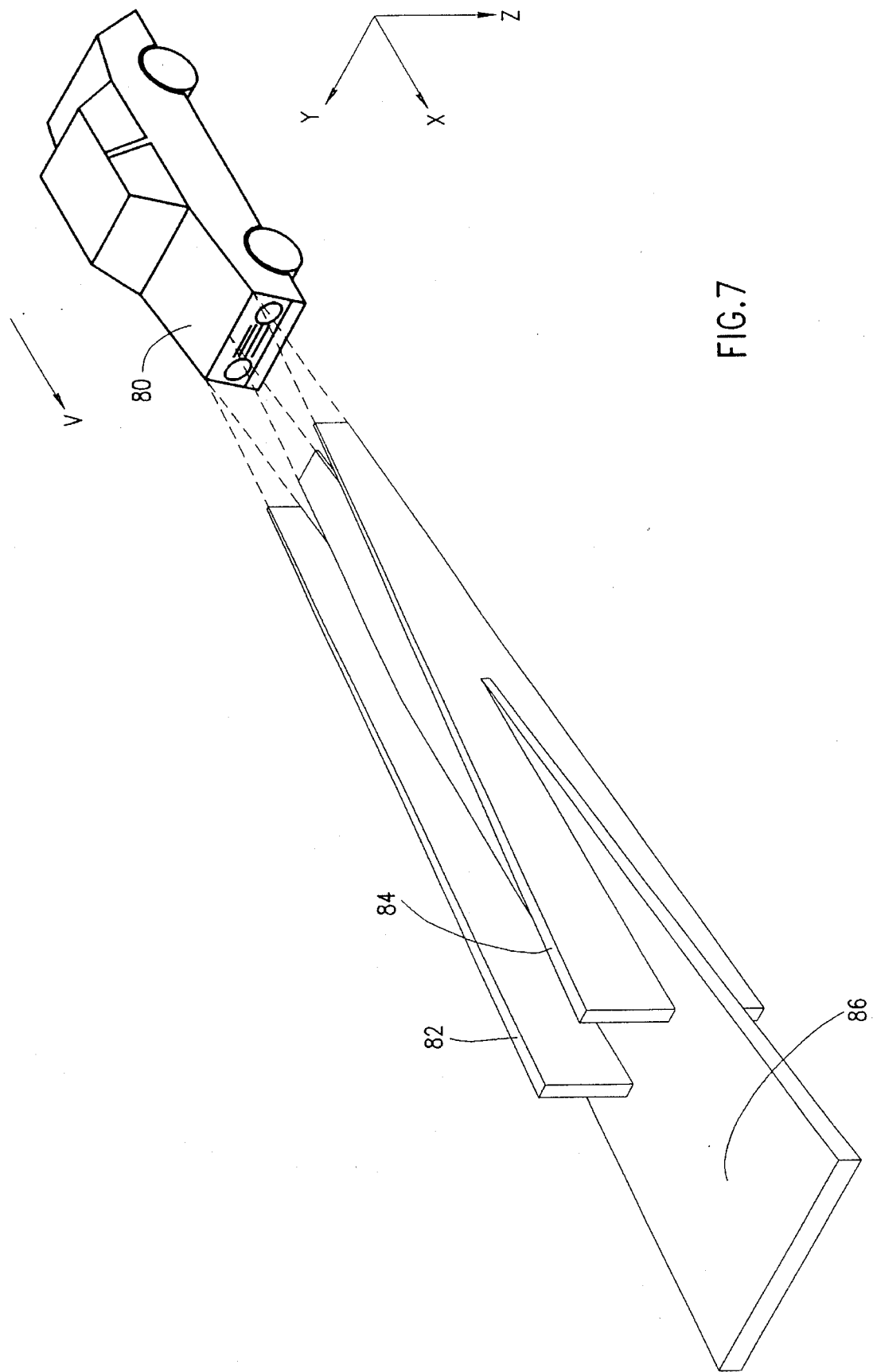
FIG. 7 is a simplified pictorial illustration of a maximum danger box defined with respect to a moving vehicle.

A preferred embodiment of FFT ranging processor 54 is illustrated in block diagram form in FIG. 5 and includes a clock and synchronizer 60, such as an Altera 5064, which preferably operates at 40 MHz and provides synchronizing clock outputs to the elements described hereinbelow. An analog video signal from video amplifier 52 (FIG. 2) is supplied to a an 8-bit analog to digital converter 62, such as a Sony CVA 1056K. Converter 62 outputs via a 1 KByte FIFO memory unit 64, such as an IDT 7203, to a PDSP 16510 stand-alone FFT processor 66, such as a Plessey 16510, which operates as a spectrum analyzer.

The output of processor 66 is supplied to a digital signal processor 68, such as a MOTOROLA DSP 56116, which provides output indications of protected vehicle velocity and of angle and range for each of a multiplicity of targets. A Doppler effect-type algorithm may be employed to compute vehicle velocity.

It is a particular feature of the present invention that vehicle velocity is preferably computed by the system, rather than relying upon the velocity value provided by the odometer of the protected vehicle. The odometer value is inaccurate, particularly when the car wheels skid due to poor weather conditions or other factors. The protected vehicle velocity is employed by the apparatus of the present invention to distinguish static objects from moving objects.

A sample technical specification for EMR 12 of FIG. 2 is as follows:
RF frequency: 24 GHz
Transmitted Power: 20 mw
Range: 1.5–192 meters.
Range resolution: 0.75 meters.
Target velocity range: 0–299 kph.
Maximum detectable range: 192 meters for an RCS of 5 m$^2$
Angular resolution at 192 meters: 2 degrees.
Maximum frequency deviation: 200 MHz.
Sawtooth duration: 25 microsec
Pulse repetition rate: 16.6 KHz.

Figure 3A:
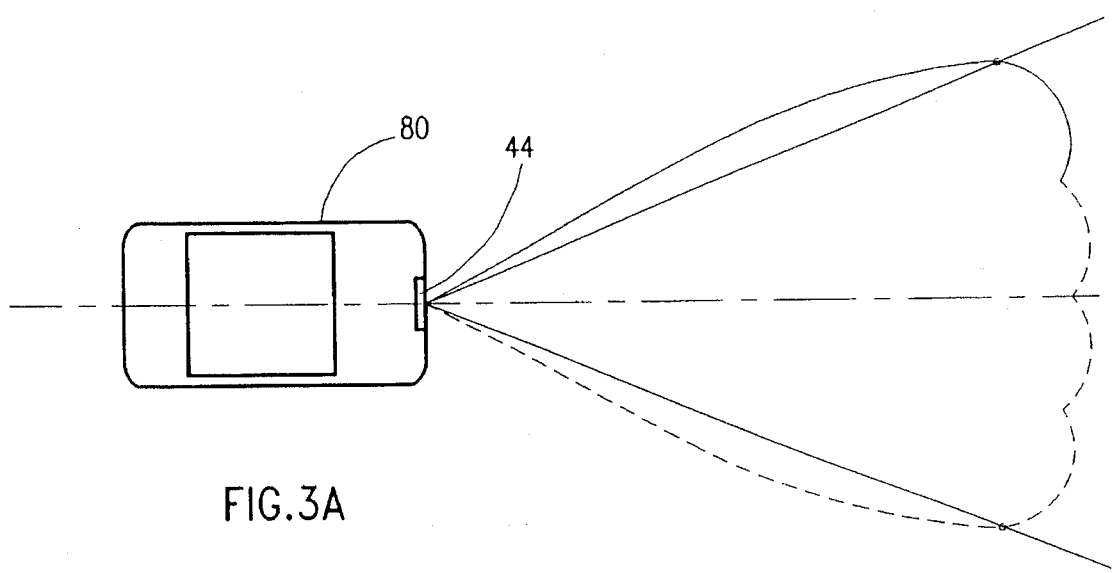
FIGS. 3A and 3B are respective top view and side view simplified illustrations of some of the coverage regions of the radar apparatus of FIG. 2.
Figure 3B:
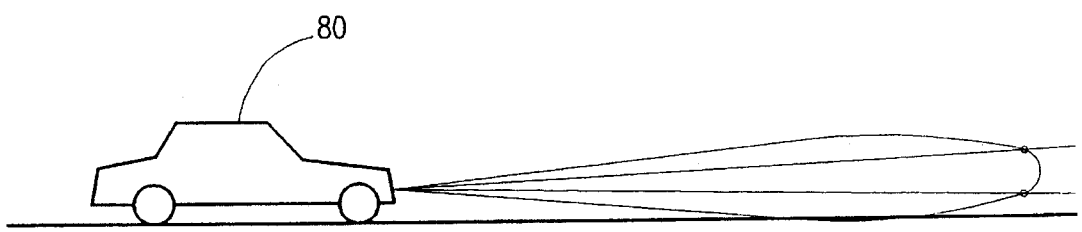
Figure 3C:
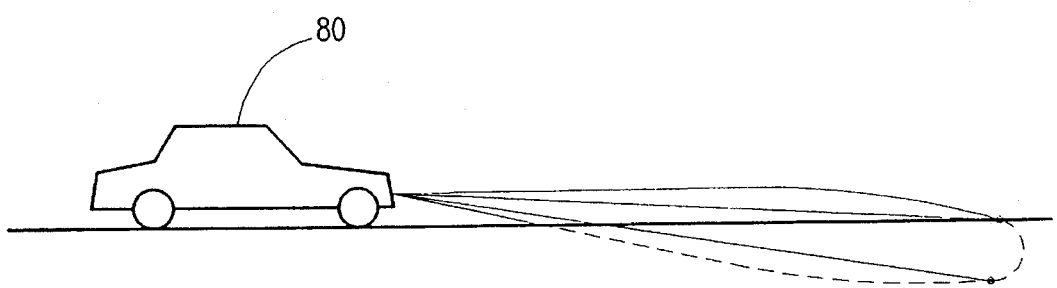
FIG. 3C is a side view simplified illustration of another coverage region of the radar apparatus of FIG. 2.

Reference is now made to FIGS. 3A, 3B and 3C. FIGS. 3A and 3B illustrate the composite radar coverage region of target sensing antenna array 44, while FIG. 3C illustrates the ground engaging radar coverage region of antenna 40, which is used for determination of the ground speed of a protected vehicle in which the system of FIG. 1 is installed.

FIG. 4 illustrates in greater detail the makeup of the coverage region of antenna array 44, as shown in FIG. 3A, such that the individual coverage regions of each of the four antenna elements can be seen individually. It is seen that the individual coverage regions of each of the four antenna elements are located in side by side partially overlapping arrangement in azimuth. Preferably, angle alpha in FIG. 4 is approximately 15 degrees and angle beta in FIG. 4 is approximately 10 degrees. The field of view (FOV) gamma in front of the protected vehicle is approximately +/−15 degrees.

FIG. 6 illustrates in even greater detail the interrelationship between target detections in adjacent individual antenna element coverage regions, which can be used to provide an indication of the angular position of a target.

A preferred procedure for determining the angular position of a target 55 is now described with reference to FIG. 6. FIG. 6 illustrates individual coverage regions 56 and 58 of two antenna elements respectively. Target 55 is differentiated from other targets because the range detected therefor differs from the range detected for other targets. Target 55 is identified as a single target even though it is detected by two antenna elements, or more generally by up to 4 antenna elements, because the ranges detected by each of the antenna elements are equal.

When antenna element 56 is active, the intensity of the EM echo returning from target 55 is proportional to the length of segment OA in FIG. 6. When antenna element 58 is active, the intensity of the EM echo returning from target 55 is proportional to the length of segment OB in FIG. 6. Because the shape of the beams 56 and 58 are known, the angular position of target 55 may be computed as a function of OA/OB.

Referring back to FIG. 5, when antenna element 56 is active, FFT processor 66 provides and stores data on the intensity of the target 55 and of all other targets, for all ranges. When antenna element 58 is active, the same data is provided and stored for antenna 58. The data from antenna elements 56 and 58 are compared. Subsequently, FFT processor 66 provides and stores the same data for a third antenna element (not shown) and the data for antenna element 58 is compared to the data for the third antenna element. This process is repeated in order to allow comparison of data for the third and fourth antenna elements. Alternatively, data from three sequentially active antenna elements may be compared.

Reference is now made to FIGS. 7, 8A, 8B and 8C which illustrate a pattern of laser beams which are generated in front of a protected vehicle 80 in which the system of FIG. 1 is installed, to define a protected region, termed herein a "maximum danger region (MDR)" or a "laser MDR". Targets which are detected within the maximum danger region are deemed dangerous to the protected vehicle. In accordance with a preferred embodiment of the invention, the pattern of laser beams includes a pair of spaced vertical fan beams 82 and 84 which extend generally parallel to the sides of the vehicle, preferably for a distance of about 50 meters. The pattern of laser beams also includes a generally horizontal fan beam 86, which extends generally parallel to the road surface at a height of approximately 0.5 meters, for a distance of about 70–75 meters from the protected vehicle, and covers approximately +/–1 degree.

Referring back to FIG. 3A, the composite radar coverage region generated by target sensing antenna array 44 in front of protected vehicle 80 also defines a protected region, termed herein a "maximum danger region (MDR)" or a "radar MDR". Targets which are detected within the laser or radar maximum danger regions are deemed dangerous to the protected vehicle. More specifically, if weather conditions permit operation of laser antenna array 44, intrusion into the laser MDR is a preferred criterion of danger. If weather conditions do not permit effective operation of laser antenna array, intrusion into the radar MDR is employed as a criterion of danger.

FIG. 9 illustrates electro-optical laser transmitter and receiver subsystem 18 of FIG. 1. Subsystem 18 employs the laser beams 82, 84 and 86 for detecting objects within the protected region in front of the vehicle 80. The apparatus of FIG. 9 is based on a processing and control subsystem 90, typically employing an INTEL 8051 microprocessor. The INTEL 8051 microprocessor may be programmed to digitally implement a nonlinear maximum slew rate closed-loop filter, described in the following document, the disclosure of which is incorporated herein by reference:

Faibish, S. and Moscovitz, J. "A new closed-loop nonlinear filter design", Proc. of the 1st European Control Conference, pp. 38–43, Grenoble, France, 2–5 Jul. 1991.

Processing control subsystem 90 provides power and control signals to a pulse modulator circuit 92, which in turn provides a current signal to three laser beam emitters 94, 96 and 98, such as a laser diode RCA-C86091E, causing them to provide respective fan beams 82, 84 and 86.

Emitters 94, 96 and 98 also provide a signal output via a fiber optic delay line 100 to an optical receiver 102, such as a InGaAS photodiode RCA-C30642E. Optical receiver 102 receives reflected light from beams 82, 84 and 86 and provides an analog output to a signal detecting amplifier 104, such as a TRANS IMPEDANCE amplifier circuit, manufactured by Rafael, POB 2082, Haifa. Signal detecting amplifier 104 receives timing signals from processing and control subsystem 90 and provides logic signals thereto.

Signal detecting amplifier 104 also interfaces with a time of flight discriminator 106 which may comprise a fast comparator LM-161, commercially available from National, a passive time to voltage converter and a 10 bit A/D converter AD-571, commercially available from Analog Devices. Time of flight discriminator 106 provides a time of flight output, identifying targets impinged upon by one or more of the beams 82, 84 and 86, to the processing and control subsystem 90. The subsystem 90 is operative to provide range data output information for targets impinged upon by beams 82, 84 and 86 to alarm decision subsystem 16 (FIG. 1).

A sample mode of operation of subsystem 90 and the components of FIG. 9 which are associated therewith is as follows:

The software portion of subsystem 90 receives a start/reset command from the central processor of subsystem 90 and generates a digital trigger signal which is provided to pulse modulator circuit 92. Subsystem 90 receives light signals M, L and R. These signals indicate that one of the walls of the laser MDR has been touched or encountered by an object, as explained herein.

Subsystem 90 also generates a status byte which indicates various possible states of laser subsystem 18, such as erroneous measurements, no target in field of vision, or malfunction of transmitter. The central processor of subsystem 90 receives 1 byte data from time of flight processing unit 106 and computes a 2 byte long range value. Preferably, the value is computed by dividing, each msec, the time of flight value by 6.6 nsec/m, corresponding to half of the velocity of light.

The resulting range data is filtered using the above-described maximum slew rate nonlinear closed-loop filter which filters each range measurement independently rather than averaging several range measurements. The noise derivative of the filter is very large whereas the signal has low limited derivative values. The 2 byte filtered range data and the laser subsystem status byte are employed to generate a signal which arrives at the central processor of subsystem 90, using a RS232 serial communication protocol each 50 msec.

Figure 10:
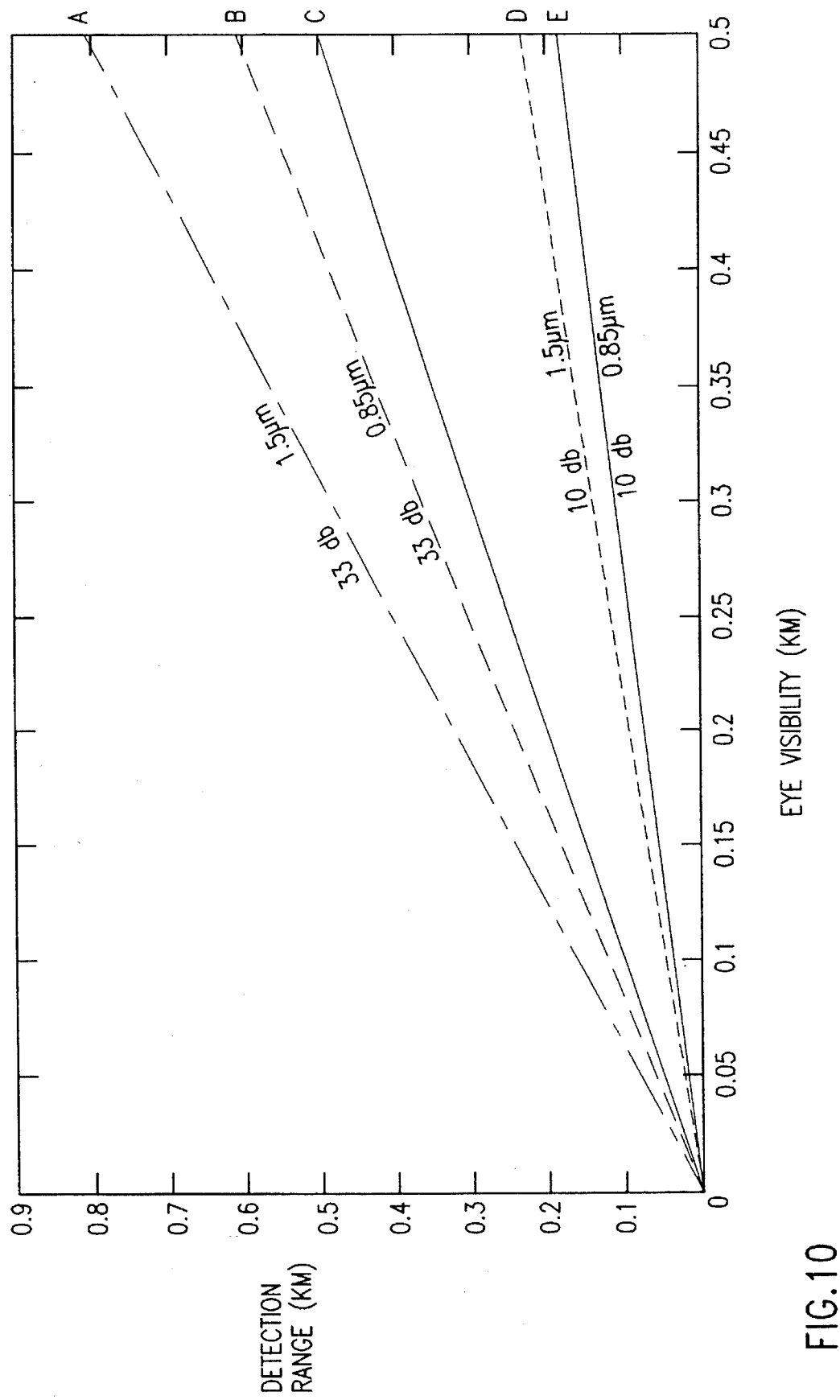
FIG. 10 is a graph representing the relative sensitivity of the laser transmitter and receiver apparatus and the human eye.

FIG. 10 provides a graphic comparison between the sensitivity of the laser beam transmitter and receiver subsystem 18, represented along the vertical axis, and the vision capability of the human eye, represented along the horizontal axis. Subsystem 18 is compared to the human eye for two laser wavelengths, 1.5 micrometers (graphs A and D) and 0.85 micrometers (graphs B and E), and for two types of objects to be detected: objects with retroreflective properties (graphs A and B) and objects without retroreflective properties (graphs D and E). Sample objects with retroreflective properties are the retroreflective papers used in the rear of cars, cat eyes, and road indicators.

Graph C is a theoretical curve along which the detection range of the laser subsystem 18 is equal to the detection range of the human eye. Graphs A and B are above graph C, indicating that for objects with retroreflective properties, the laser detection range is greater than the detection range of the human eye. In graphs A and B, the SNR (signal to noise ratio) is 33 db, because the returned light is amplified and the noise is not amplified. Graphs D and E are below graph C, indicating that for objects without retroreflective properties, the laser detection range is less than the detection range of the human eye. In graphs C and D, the SNR is 10 db, less than for retroreflective objects.

It is noted that the detection range of the human eye is diminished by poor weather conditions such as fog and rain.

Figure 11:
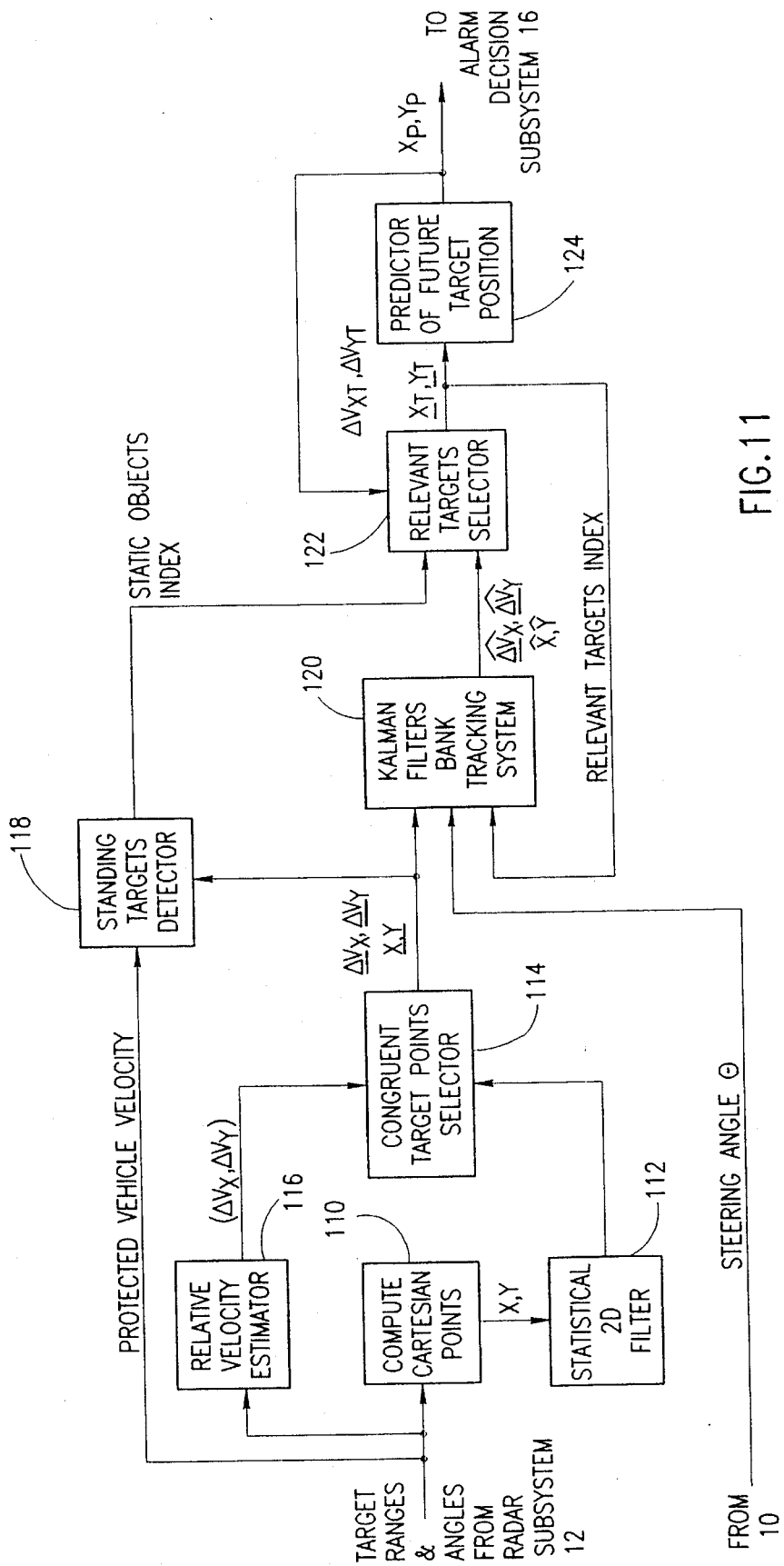
FIG. 11 is a block diagram illustration of the multiple target tracking subsystem forming part of the apparatus of FIG. 1.

Reference is now made to FIG. 11 which is a block diagram illustration of multiple target tracking subsystem 14 of FIG. 1. Inputs representing the velocity of the protected vehicle 80 and the ranges and velocities of targets identified by the radar subsystem 12 are received by apparatus 110 which is operative to compute the relative locations of the targets in Cartesian coordinates. The x,y coordinates of the targets are supplied via a statistical 2-dimensional filter 112 to a congruent target points selector 114, which is operative to determine which detected points are congruent. Congruent points are points along the same target and can be identified by determining whether the position and velocity vectors of a plurality of points are characteristic of a single target or of two or more closely spaced targets.

The operation of congruent target points selector 114 may be based on maximum likelihood or least square error estimation methods such as those described in A. Gelb, Applied Optimal Estimation, MIT Press, 1974, the disclosure of which is incorporated herein by reference. Congruent target points selector 114 also receives delta $V_x$, delta $V_y$ outputs for each identified target from a relative velocity estimator unit which receives range and angle signals for each target from radar subsystem 12.

The congruent target points selector 114 provides, for each identified target, its location in x, y coordinates and a (delta $V_x$, delta $V_y$) vector representing the x,y coordinates of the velocity of the individual target relative to the protected vehicle. These outputs as well as an input of the velocity of protected vehicle 80 are supplied to a standing targets detector 118, which may comprise a unit for discriminating relative velocity. Standing target detector 118 identifies and provides an index of static objects.

A Kalman filter bank tracking system 120 is provided, such as the system described in Y. Bar-Shalom, Ed., *Multitarget Multisensor Tracking: Advance Applications*, Artech House publishers, 1990. Kalman filter bank 120 receives the output of selector 114 and an input representing the steering angle, theta, of the vehicle 80 from sensor 10 (FIG. 1). The Kalman filter is operative to predict the relative positions of the protected vehicles and targets in its vicinity, after a time interval t of typically one second. Kalman filters are described in the above referenced publication by A. Gelb, the disclosure of which is incorporated herein by reference.

Figure 13:
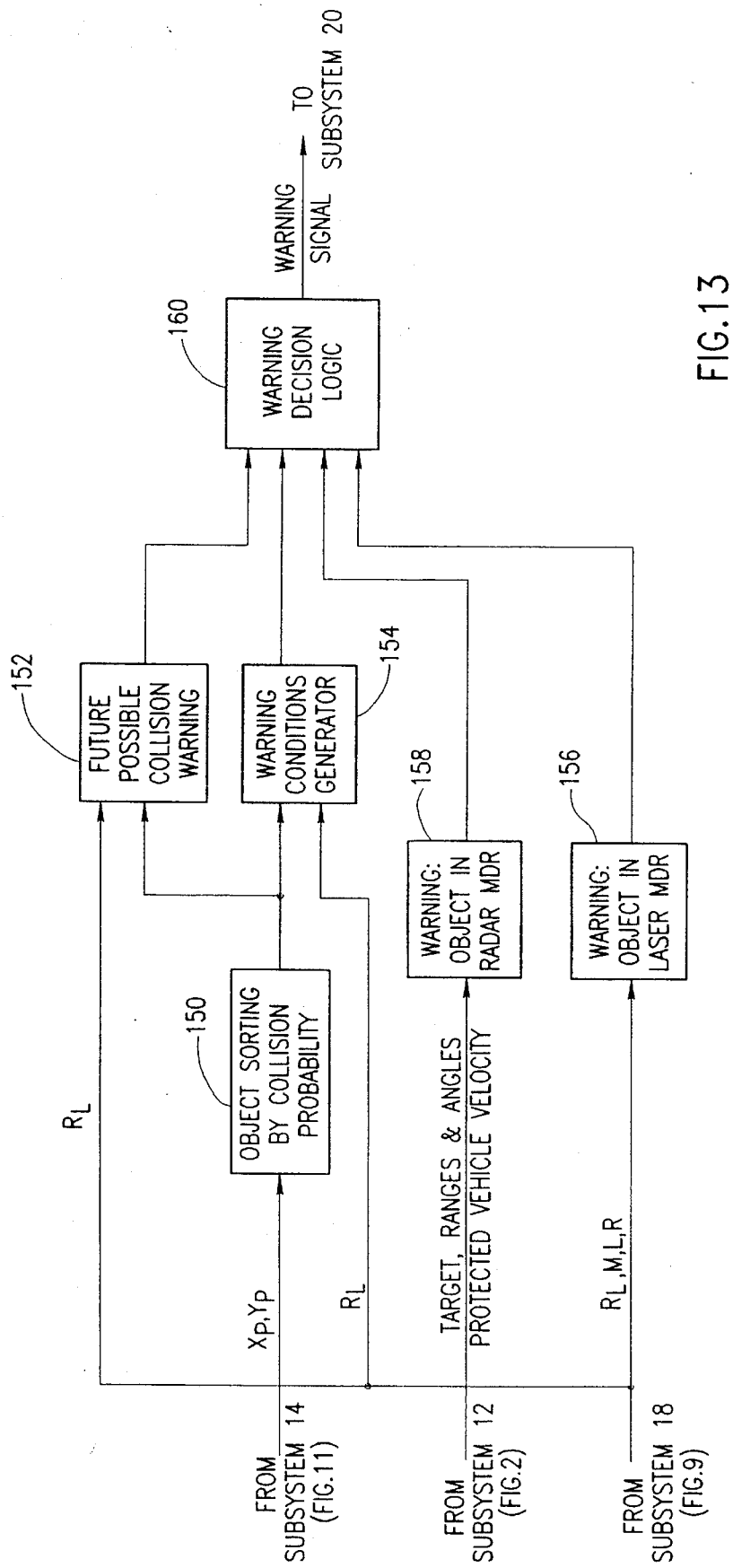
FIG. 13 is a block diagram illustration of the alarm decision apparatus forming part of the apparatus of FIG. 1.

A relevant targets selector 122, such as a go-no go logic switching system, receives the output of the Kalman filter bank system 120 as well as the output of standing targets detector 118 and provides an output indicating the position and velocity vectors of each of a predetermined number, such as 10, of the most dangerous objects in the field of vision. The output of detector 118 is provided to apparatus 124 for predicting future target position. The output of apparatus 124, expressed as $X_p$, $Y_p$, is supplied to alarm decision subsystem 16, which is illustrated in FIG. 13. Relevant target selector 122 also provides feedback to Kalman filter bank system 120.

The operation of the apparatus of FIG. 11 will now be briefly explained with reference to the illustration of FIG. 12. The apparatus of FIG. 11 is operative to track a plurality of n targets relative to a protected vehicle moving at a velocity of $v_0$. The position and velocity of each object is estimated by a single Kalman filter of the bank 120. The positions and velocities may be represented in a Cartesian coordinate system such as the Cartesian coordinate system of FIG. 12 whose origin is the middle of the protected vehicle.

Figure 12:
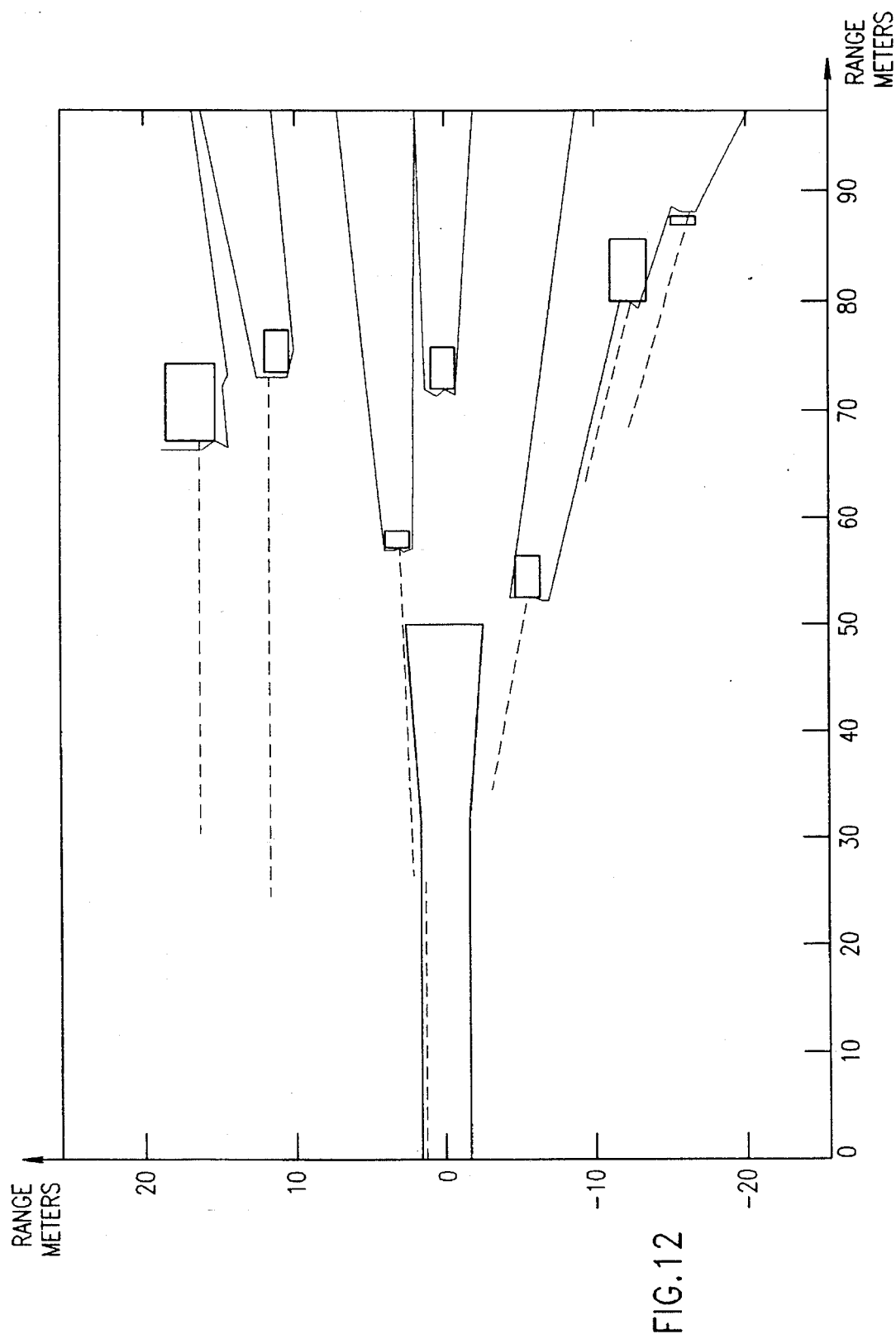
FIG. 12 is an illustration of the operation of the multiple target tracking subsystem of FIG. 11.

FIG. 12 represents a typical highway scenario including 7 targets. Trajectories of each of the 7 targets for a predetermined future time period such as one second are indicated in broken lines.

Reference is now made to FIG. 13 which illustrates the alarm decision subsystem 16 of FIG. 1. The $X_p$, $Y_p$ input from the multiple target tracking subsystem 14 (FIG. 11) is supplied to a unit 150 which sorts targets or objects by collision probability. Target sorter unit 150 outputs to future possible collision warning unit 152, and to a warning conditions generator 154, both of which also receive an input $R_L$ from laser subsystem 18. The laser subsystem 12 also provides outputs $R_L$, M, L, and R to a unit 156 for indicating the presence of an object in the maximum danger region defined by the laser subsystem 18.

The target range, target angle and protected vehicle velocity outputs from radar subsystem 12 are supplied to a unit 158 for indicating the presence of an object in the maximum danger region defined by the radar subsystem 12.

The outputs of apparatus 152, 154, 156 and 158 are all supplied to warning decision logic apparatus 160 which is operative to provide an alarm warning signal to subsystem 20.

Figure 14:
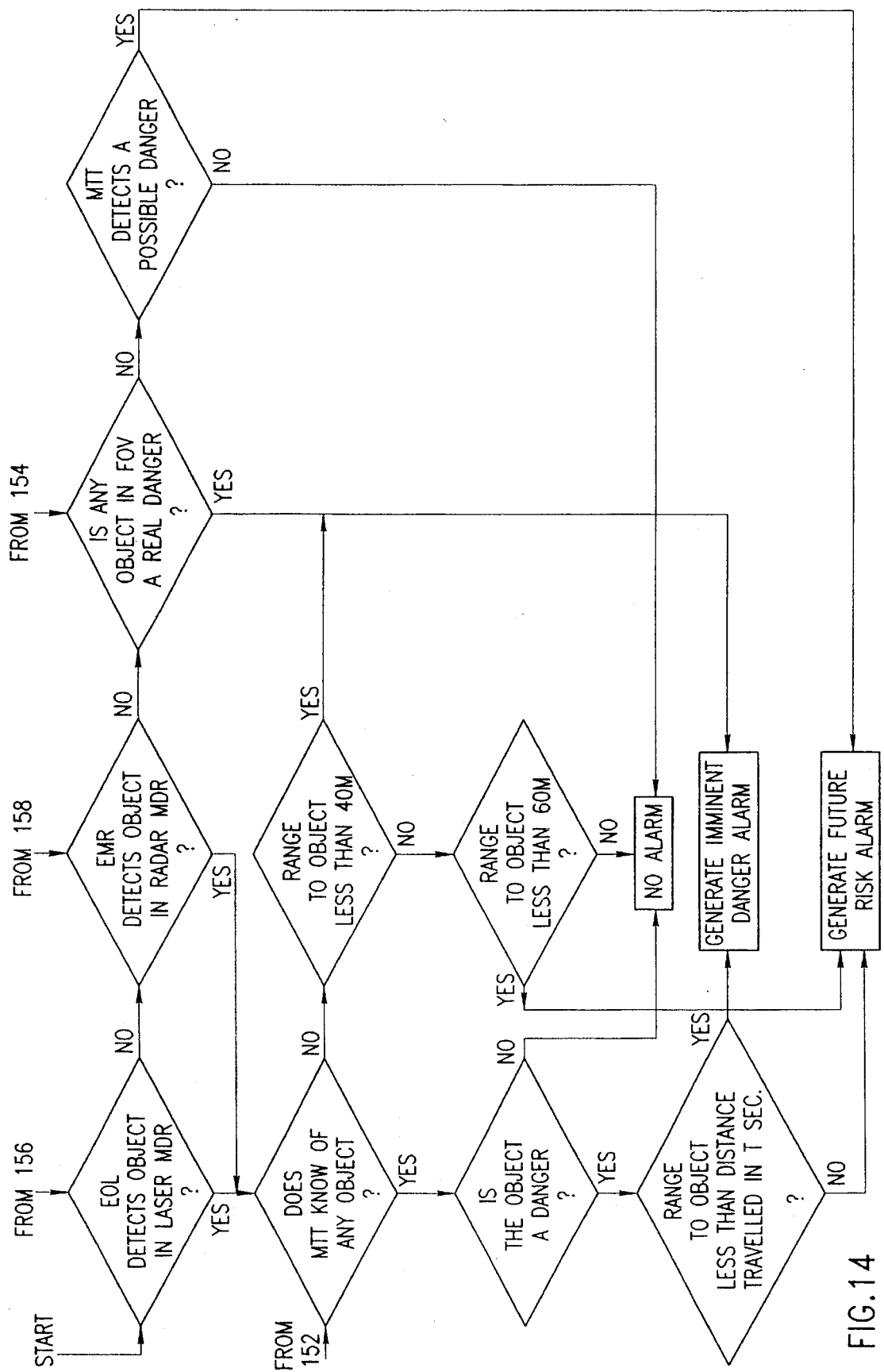
FIG. 14 is a flow chart illustrating operation of block 160 of FIG. 13.

A preferred logical sequence for warning decision logic apparatus A60 is described in flowchart form in FIG. 14. seen in FIG. 14, data from the electro-optical laser sensor apparatus 156 provides a warning indication which is used for generating an alarm signal (LIW) having decreased false alarms. If the LIW signal is "1", i.e. the laser has detected an object in the maximum danger box (MDB), an inquiry is made as to whether the multiple target tracking subsystem (MTT) is aware of the object.

If it is determined that the object constitutes a danger to the vehicle, a weak alarm signal is generated. If not, the range to the object, supplied by the laser sensor, is classified. If the range is greater than the estimated distance traveled by the object in T seconds, a weak alarm signal is generated. If the range is less than the previously defined distance, a strong alarm signal is generated.

If, however, the trajectory of the object crosses the MDB and leaves the MDB, there is no danger and no alarm is generated. If the MTT did not designate the object as a danger, such as because of a small probability of collision, the object continues to be tracked by a Kalman filter. If the object subsequently constitutes a danger, a strong alarm is generated because the initial evaluation of the MTT was incorrect.

If the specific object is unknown to the MTT and the range to it measured by the EO laser is less than 40 meters, a strong alarm signal is generated. Such an occurrence could represent a person crossing the MDB in front of the vehicle. Otherwise, if the range is between 40 and 60 meters, a weak alarm signal is generated.

In cases where no object is detected in the MDB by the EO laser, a check is made whether the radar has detected any intrusion in the MDB. This is particularly important in bad environmental conditions when the field of view of the EO laser system is limited or when the EO laser system's vision is obstructed, as by dirt. In the second instance, the false alarm probability increases because of the limited angular resolution of the radar sensor subsystem 12 as compared with the laser sensor subsystem 18.

In order to enable the radar subsystem 12 to be employed alone in situations characterized by acceptable false alarm rates, a virtual box overlapping the MDB is defined and an occupancy probability matrix is associated therewith as explained hereinbelow in connection with FIGS. 16A and 16B.

In cases where the radar sensor detects an object, the decision scheme is identical with the case when the laser sensor has detected an object.

When neither the laser sensor nor the radar sensor has detected an intruder in the MDB, if there is any object in the field of view FOV representing a real danger, i.e. producing a collision probability of "1", a strong alarm signal is generated. If the collision probability of the closest object in the field of view tracked by the MTT has a collision probability close to but smaller than "1", a weak alarm signal is generated. If the maximum collision probability, for all objects in the FOV, is less than a given threshold value, no alarm signal is generated.

Figure 15:
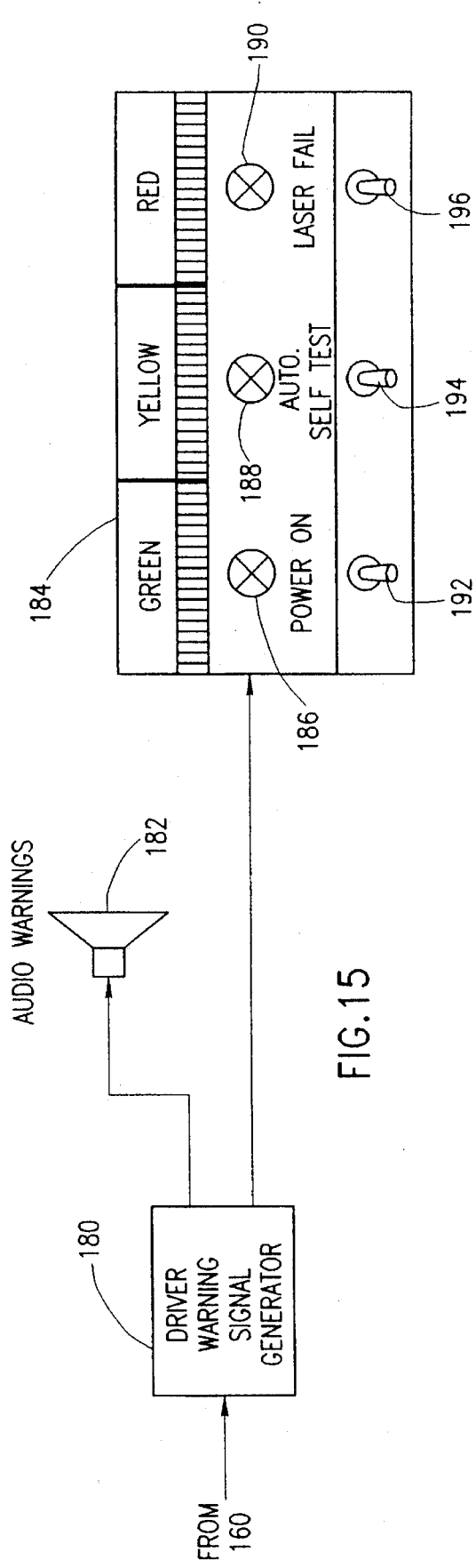
FIG. 15 is a simplified block diagram of the audio visual alarm sub-system forming part of the apparatus of FIG. 1.

FIG. 15 illustrates a preferred embodiment of the audio-visual alarm subsystem 20 (FIG. 1). The subsystem preferably includes a driver warning signal generator 180 which receives the output of warning decision logic 160 (FIG. 13) and provides an output to an audio transducer 182 and well as an additional output to a visual display 184.

Visual display 184 is preferably configured for displaying the intensity of the warning to the driver. In the illustrated embodiment, visual display 184 includes a green display area, corresponding to a "no alarm" state, a yellow display area, corresponding to a "future risk" or weak alarm state, and a red display area, corresponding to an "imminent danger" or strong alarm state. Visual display 184 also has indicators 186, 188 and 190 for indication of POWER ON, SELF TEST and LASER FAILURE respectively as well as corresponding manually operable switches 192, 194 and 196.

Figure 16B:
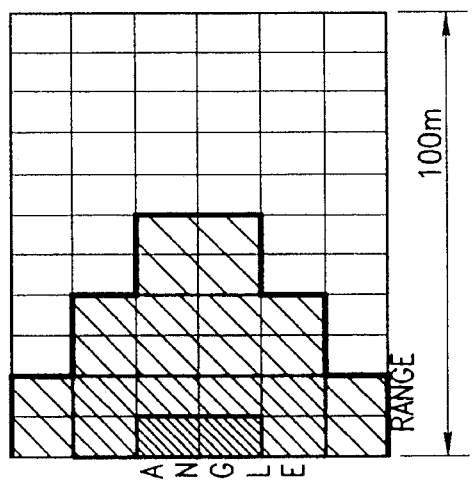
FIGS. 16A and 16B are drawings of an occupancy probability map and matrix which are employed under certain conditions by the alarm decision subsystem.
Figure 16A:
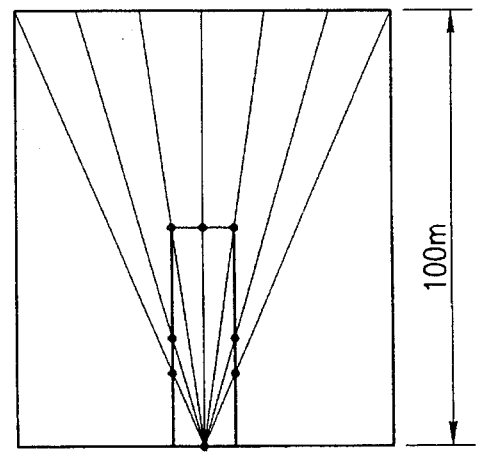

Reference is now made to FIGS. 16A and 16B which conceptually illustrate a preferred method for determining whether or not laser subsystem 18 has failed to give an indication of the presence of an object in the maximum danger region. The method of FIGS. 16A and 16B may be implemented by any suitable unit, such as unit 158.

As shown in FIG. 16A, according to a preferred embodiment of the present invention, the radar subsystem 12 is employed to determine the range of the closest object in each of a plurality of directions. This information is preferably employed to determine whether any of the objects detected fall within the maximum danger region, which generally indicates malfunction on the part of laser subsystem 18. The reliability of the information regarding the presence of an object in the MDR, as well as the probability that the object would collide with the protected vehicle, are preferably taken into account when assessing the function of laser subsystem 18. For example, if the radar subsystem provides a relatively reliable indication of an object within the MDR, and this object was not detected by the laser subsystem, then it is relatively probable that the laser subsystem is malfunctioning, due to weather conditions or for other reasons.

FIG. 16B illustrates a matrix indicating the level of confidence that an object is in fact a danger, in a situation where an object has been detected by the radar subsystem at a particular angle and at a particular range. Densely shaded elements of the matrix indicate angle and range pairs for which there is a high level of confidence that an object is present at the location indicated. Sparsely shaded elements of the matrix indicate angle and range pairs for which there is a low level of confidence that an object is present at the location indicated.

It will be appreciated by persons skilled in the art that the present invention is not limited by what has been particularly shown and described hereinabove. Rather the scope of the present invention is defined only by the claims which follow:

We claim:

1. A collision avoidance and warning system for land vehicles comprising:

a radar transmitter/receiver module for sensing the presence of objects within a spatial range relative to a vehicle;

an auxiliary laser radar including a laser beam generator associated with a target intrusion sensor which detects intrusion of a target into a danger region having laser beam defined walls by generating a trigger signal indicating that one of the walls has been encountered by an object; and an alarm activator receiving an input from said radar transmitter/receiver module and from said target intrusion sensor for indicating the alarm status of a target and for providing an output indication to alarm generating apparatus.

2. A system according to claim 1 and also comprising an alarm generator for providing an indication of alarm status to a vehicle driver.

3. A system according to claim 1 and wherein said radar transmitter/receiver module comprises plural radar antenna apparatus.

4. A system according to claim 3 and wherein said plural antenna apparatus includes at least one antenna for sensing vehicle ground speed.

5. A system according to claim 3 and wherein said plural antenna apparatus includes a plurality of antennas for target detection.

6. A system according to claim 5 and wherein said plurality of antennas are arranged such that their detection regions are distributed in partially overlapping orientation in azimuth.

7. A system according to claim 6 and wherein said radar transmitter/receiver module also comprises an antenna output inspector for comparing the outputs of more than one of said plurality of antennas relating to a given object in order to define the angular position of said object with enhanced resolution.

8. A system according to claim 1 and wherein said transmitter/receiver module includes a target motion detector for distinguishing moving targets from stationary targets.

9. A system according to claim 1 and wherein said target velocity characterizer includes apparatus for disregarding targets whose vectors do not fall within a danger envelope defined with respect to the velocity vector of a protected vehicle.

10. A system according to claim 1 and wherein said auxiliary laser radar includes a laser system which provides first and second generally vertical beam walls which delimit a range of protection with respect to a protected vehicle.

11. A system according to claim 1 and wherein said auxiliary laser radar includes a laser system which provides a generally horizontal beam fan spaced from the roadway which at least partially delimits a range of protection with respect to a protected vehicle.

12. A system according to claim 1 and also comprising a laser radar operation sensor operative to sense impaired operation of said auxiliary laser radar and to modify the operation of the system in accordance therewith.

13. A collision avoidance and warning method for land vehicles including:

radar sensing the presence of objects within a spatial range relative to a vehicle;

sensing targets by target intrusion sensing techniques which generate laser beams and detect intrusion of a target into a danger region having laser beam defined walls by generating a trigger signal indicating that one of the walls has been encountered by an object; and receiving a target intrusion sensing input and on the basis thereof indicating the alarm status of a target and providing an output indication to a driver.

14. A method according to claim 13 and wherein said radar sensing includes sensing ground speed of the vehicle.

15. A method according to claim 13 and wherein said radar sensing comprises comparing the outputs of more than one of a plurality of antennas relating to a given object in order to define the angular position of said object with enhanced resolution.

16. A method according to claim 13 and wherein said radar sensing includes distinguishing moving targets from stationary targets.

17. A method according to claim 13 and wherein said sensing targets includes defining first and second generally vertical laser beam walls which delimit a range of protection with respect to a protected vehicle.

18. A method according to claim 13 and wherein said sensing targets includes defining a generally horizontal laser beam fan spaced from the roadway which at least partially delimits a range of protection with respect to a protected vehicle.

19. A method according to claim 13 and also comprising sensing impaired performance of said sensing targets and modifying the method in accordance therewith.

20. A method according to claim 19 and wherein said sensing impaired performance and modifying comprise radar transmission and reception in an occupancy probability sensing mode of operation.

21. A system according to claim 1 wherein alarm status defines a plurality of alarm states including the following alarm states: no alarm, future risk, and imminent danger.

22. A system according to claim 12 and wherein said non-radar operation sensor comprises apparatus for operating said radar transmitter/receiver module in an occupancy probability sensing mode of operation.

\* \* \* \* \*